C. E. REED.
TAILOR'S MEASURING INSTRUMENT.
APPLICATION FILED AUG. 2, 1916.

1,237,958.

Patented Aug. 21, 1917.

Witnesses

Inventor
Charles E. Reed
By Victor J. Evans
Attorney

UNITED STATES PATENT OFFICE.

CHARLES E. REED, OF WARRENSBURG, MISSOURI.

TAILOR'S MEASURING INSTRUMENT.

1,237,958.  Specification of Letters Patent.  Patented Aug. 21, 1917.

Application filed August 2, 1916. Serial No. 112,811.

*To all whom it may concern:*

Be it known that I, CHARLES E. REED, a citizen of the United States, residing at Warrensburg, in the county of Johnson and State of Missouri, have invented new and useful Improvements in Tailors' Measuring Instruments, of which the following is a specification.

This invention relates to an improved tailor's measuring instrument, which I call shoulder points, and which correctly ascertains and properly names the natural standing position or carriage of the head and shoulders and other portions of the bodies of persons measured for garments, and serves also as a form definer which correctly indicates the variations or abnormalities of the different portions of the body of the person being measured from the regular or ideal form; the object of the invention being to provide an improved device of this character which is simple and inexpensive of construction, which may be readily and quickly used, and which accurately gives the variations or measurements of the kind referred to.

The invention consists of the features of construction, combination and arrangement of parts hereinafter fully described and claimed, reference being had to the accompanying drawing in which:—

Figures 1, 2:
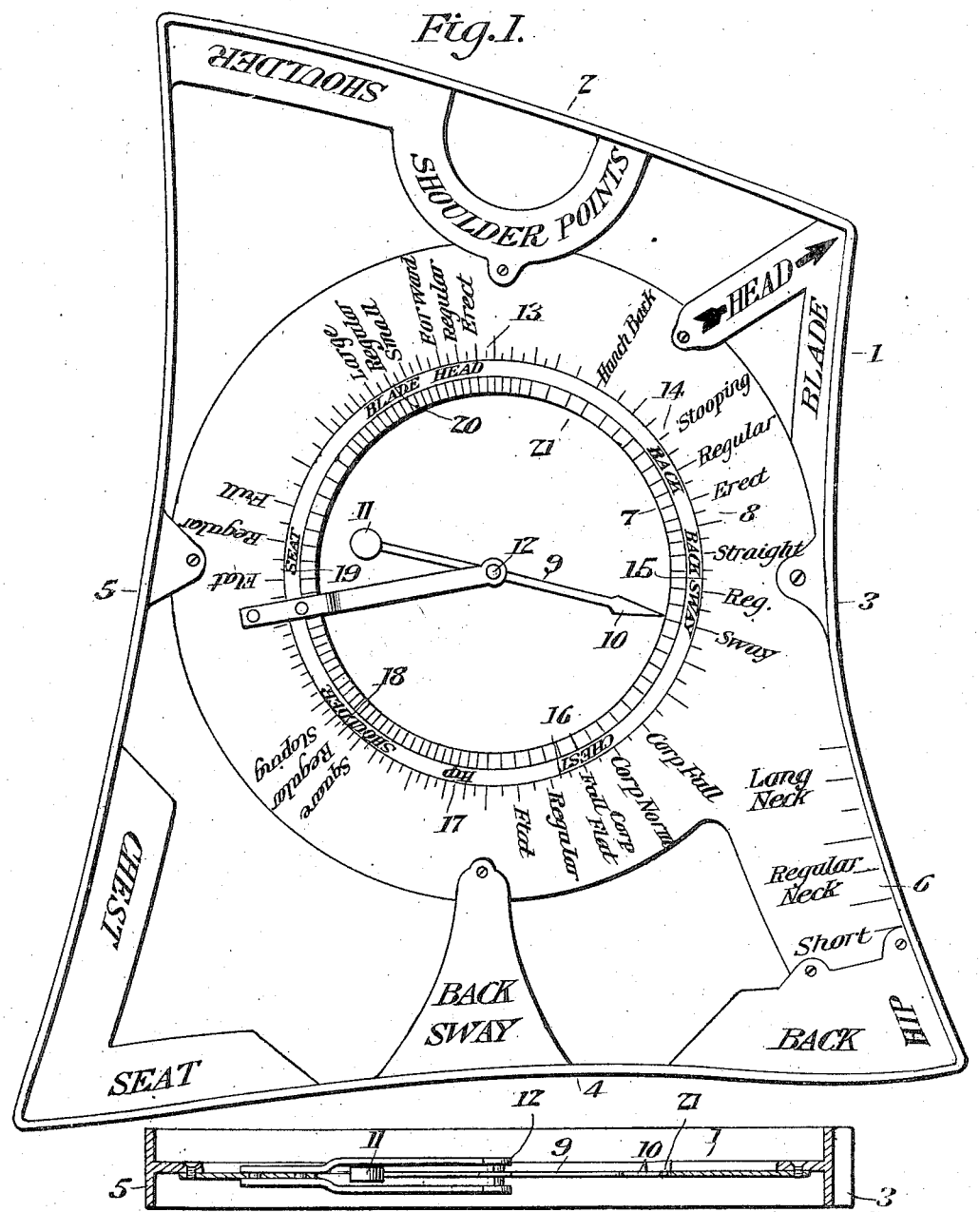
Figure 1 is a plan view of a measuring or indicating instrument constructed in accordance with my invention.
Fig. 2 is a transverse sectional view of the same.

In accordance with my invention, I provide a board or plate 1 which is shaped to present sides or marginal edges 2, 3, 4 and 5, which respectively are shaped and proportioned to fit against the shoulder and back of head, the shoulder blade and neck, the back, waist and seat, and the chest of the person to be measured. The portions of the edge 2 which are adapted for use in measuring the shoulders and head are provided with the designations "Shoulder" and "Head", the edge 3, which is designed to fit against the shoulder blade, neck and hip, is provided with designations "Blade" and "Hip" along portions thereof, and between these portions with a scale 6, marked off in graduations of suitable fractions of an inch, and inscribed "Long neck", "Regular neck" and "Short neck".

The center of the board or plate is laid out in the form of inner and outer circular divisions 7 and 8, and arranged within the circular division 7 is a balanced indicating hand 9 which has a pointer 10 at one end and a counterbalancing weight 11 at the other end, and which has a pivotal shaft 12, suitably journaled upon the board or plate, said pointer being centrally pivoted within the circular division 7 which forms a dial over the surface of which the pointer is adapted to sweep. The said circular division or dial 7 is provided with radial subdivisions and coöperating marginal scales, while the outside circular space 8 is provided with designations indicatory of the measurements indicated by graduations of the scales. The radial subdivisions are respectively inscribed "Head", "Back", "Back sway", "Chest", "Hip", "Shoulder", "Seat", and "Blade", which, together with marginal scale designations at the juncture of the concentric circles 7 and 8, form a head scale 13, back scale 14, back sway scale 15, chest scale 16, hip scale 17, shoulder scale 18, seat scale 19, and shoulder blade scale 20, the scale divisions representing successively one-fourth of an inch divisions from the regular, normal or ideal scale.

As shown, the head scale is provided with suitable inscribed designations "Forward", "Regular", and "Erect", the back scale with the designations "Hunchback", "Stooping", "Regular", and "Erect"; the back sway scale with the designations "Straight", "Regular" and "Sway"; the chest scale with the designations "Corp. full", "Corp. norm.", "Full", "Flat", "Regular" and "Flat" respectively indicating "corpulent full", "corpulent normal", "full", "corpulent flat", and the designations "regular" and "flat"; the hip scale with the designations "Small", "Regular" and "Large"; the shoulder scale with the designations "Square", "Regular", "Sloping"; the seat scale with the designations "Flat", "Regular" and "Full"; and the shoulder blade scale with the designations "Large", "Regular" and "Small". These designations are illustrated for purpose of example, it being understood that they may be varied according to the number of fractional subdivisions required.

The indicating hand is centrally pivoted with respect to the dial surface in common with all the scales thereof. In using the device all of its edges will be appropriately applied to the shoulders, back of head, back and chest and other portions, as the case may be, of the person being measured, the resulting position of the device, it being held in a vertical plane, causing the indicating hand, in coaction with the corresponding scale, to indicate the characteristic position, shape or slope of the portion being measured.

The scales above described are provided upon both sides of the instrument and the movable indicator or pointer 9 is mounted so as to be visible from both sides of the board or plate through a central opening 21 therein for coöperation respectively with the sets of scales upon the opposite sides of the instrument. By this means either side of the instrument may be employed for use, thus giving greater convenience under different conditions of service.

I claim:—

A tailor's measuring instrument comprising a board of generally trapezoidal form, and having its edges forming a plurality of angularly related marginal surfaces, varying in contour from each other, the central portion of said board being provided with radial subdivisions having scales suitably designated for coöperation with said surfaces for indicating variations of the measurements of portions of the body from the normal, the board being provided between said scales and the respective surfaces with designations indicating the various body portions and a gravity controlled pointer mounted centrally with respect to all of said scales for coöperation therewith.

In testimony whereof I affix my signature.

CHARLES E. REED.

Copies of this patent may be obtained for five cents each, by addressing the "Commissioner of Patents, Washington, D. C."